(12) United States Patent
Dell et al.

(10) Patent No.: US 9,600,187 B2
(45) Date of Patent: Mar. 21, 2017

(54) VIRTUAL GROUPING OF MEMORY

(71) Applicant: International Business Machines Corporation, Armonk, NY (US)

(72) Inventors: Timothy J. Dell, Colchester, VT (US); Prasanna Jayaraman, Austin, TX (US); Anil B. Lingambudi, Bangalore (IN); Girisankar Paulraj, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/244,010

(22) Filed: Aug. 23, 2016

(65) Prior Publication Data

US 2016/0357459 A1 Dec. 8, 2016

Related U.S. Application Data

(63) Continuation of application No. 14/104,438, filed on Dec. 12, 2013.

(51) Int. Cl.
*G06F 12/00* (2006.01)
*G06F 3/06* (2006.01)

(52) U.S. Cl.
CPC .......... *G06F 3/0617* (2013.01); *G06F 3/0631* (2013.01); *G06F 3/0664* (2013.01); *G06F 3/0683* (2013.01)

(58) Field of Classification Search
CPC ............. G06F 12/0246; G06F 12/0607; G06F 12/0623
See application file for complete search history.

(56) References Cited

U.S. PATENT DOCUMENTS

| 5,845,319 | A | * | 12/1998 | Yorimitsu | ............. | G06F 3/0626 711/114 |
| 5,953,243 | A | * | 9/1999 | Capps, Jr. | ............. | G06F 11/006 365/52 |
| 8,082,330 | B1 | * | 12/2011 | Castelli | ................. | G06F 9/5016 709/220 |
| 8,099,570 | B2 | | 1/2012 | O'Connor et al. | | |
| 8,244,965 | B2 | | 8/2012 | Huang | | |

(Continued)

OTHER PUBLICATIONS

Fredrickson D., et al., "Memory Performance Optimization for the IBM System x3850/x3950 X5, x3690 X5, and BladeCenter HX5 Platforms, Using Intel Xeon 7500 and 6500 Series Processors," IBM, Oct. 2010. Intel Xeon Processor 7500/6500 Series Memory Performance Optimization. Produced in the USA. 32 pages.

*Primary Examiner* — David X Yi
*Assistant Examiner* — Arvind Talukdar
(74) *Attorney, Agent, or Firm* — Nicholas D. Bowman

(57) ABSTRACT

The present disclosure includes identifying, in a memory system, a capacity for each of a plurality of memory modules for a first memory channel having a first amount of memory and a second memory channel having a second amount of memory; determining a memory segment size from the capacities of the memory modules; identifying a first memory segment of the memory segment size for the first memory channel and a second memory segment of the memory segment size for the second memory channel; and creating a virtual group that includes the first memory segment and the second memory segment and that uses less than the entire first amount of memory from the first memory channel.

8 Claims, 5 Drawing Sheets

Memory System

(56) References Cited

U.S. PATENT DOCUMENTS

| | | |
|---|---|---|
| 8,275,936 B1 | 9/2012 | Haywood et al. |
| 8,302,102 B2 | 10/2012 | Anand et al. |
| 8,972,694 B1 * | 3/2015 | Dolan .................... G06F 13/28 711/170 |
| 2002/0010875 A1 * | 1/2002 | Johnson ................ G06F 11/108 714/5.1 |
| 2005/0091454 A1 | 4/2005 | Shimada et al. |
| 2007/0115731 A1 | 5/2007 | Hung |
| 2008/0052462 A1 | 2/2008 | Blakely et al. |
| 2009/0037652 A1 | 2/2009 | Yu et al. |
| 2010/0057913 A1 * | 3/2010 | DeHaan ................ G06F 15/173 709/226 |
| 2010/0100669 A1 * | 4/2010 | Huang ................ G06F 12/0246 711/103 |
| 2011/0093726 A1 | 4/2011 | Worthington et al. |
| 2011/0145504 A1 | 6/2011 | Anh et al. |
| 2013/0282994 A1 | 10/2013 | Wires et al. |
| 2014/0052908 A1 | 2/2014 | Govande et al. |
| 2014/0223098 A1 * | 8/2014 | Lee ...................... G06F 9/5016 711/118 |
| 2015/0100746 A1 | 4/2015 | Rychlik et al. |
| 2015/0169445 A1 | 6/2015 | Dell et al. |
| 2015/0169446 A1 | 6/2015 | Dell et al. |
| 2015/0261698 A1 | 9/2015 | Zhang et al. |

\* cited by examiner

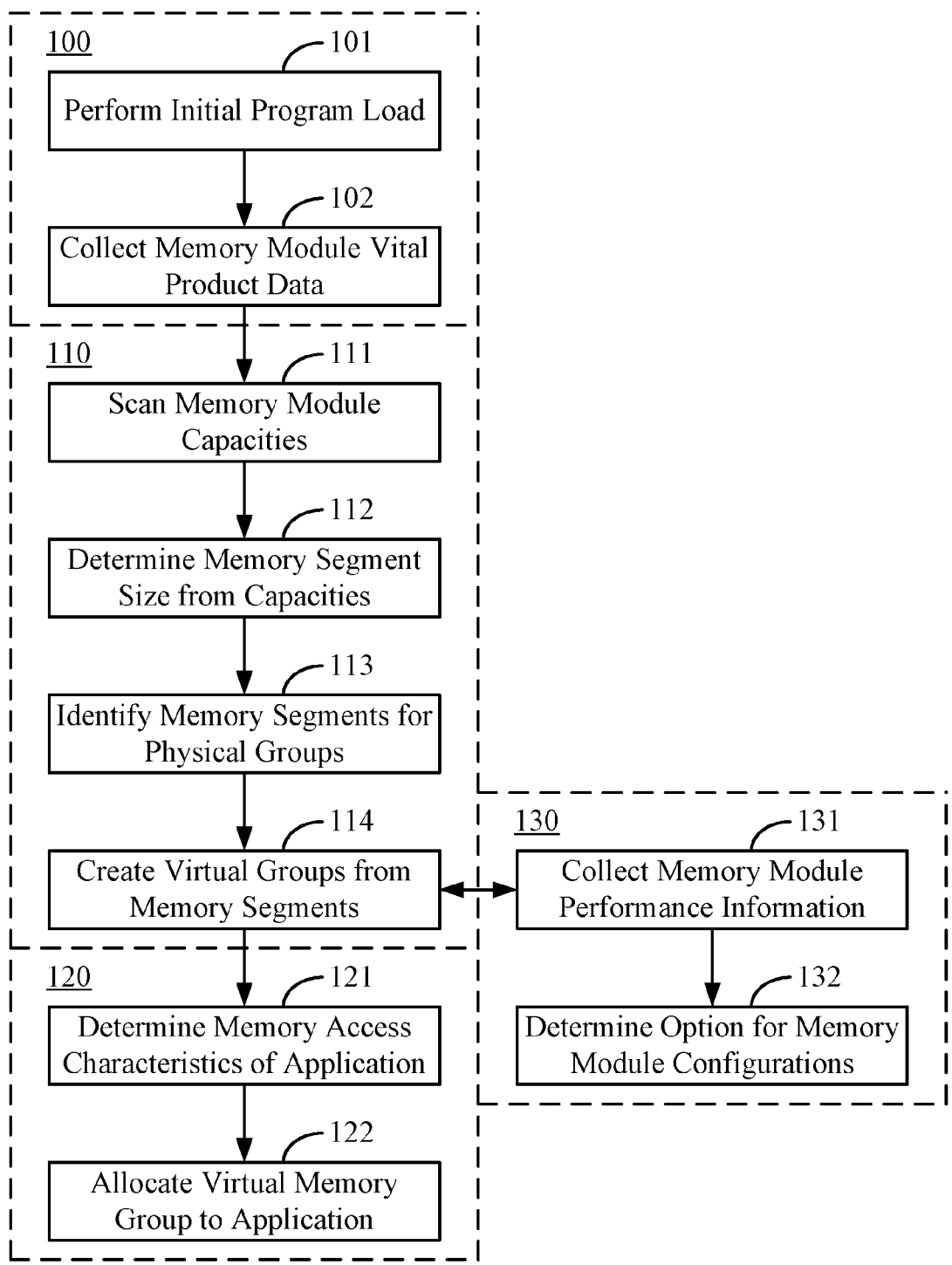
FIG. 1 – Virtual Grouping

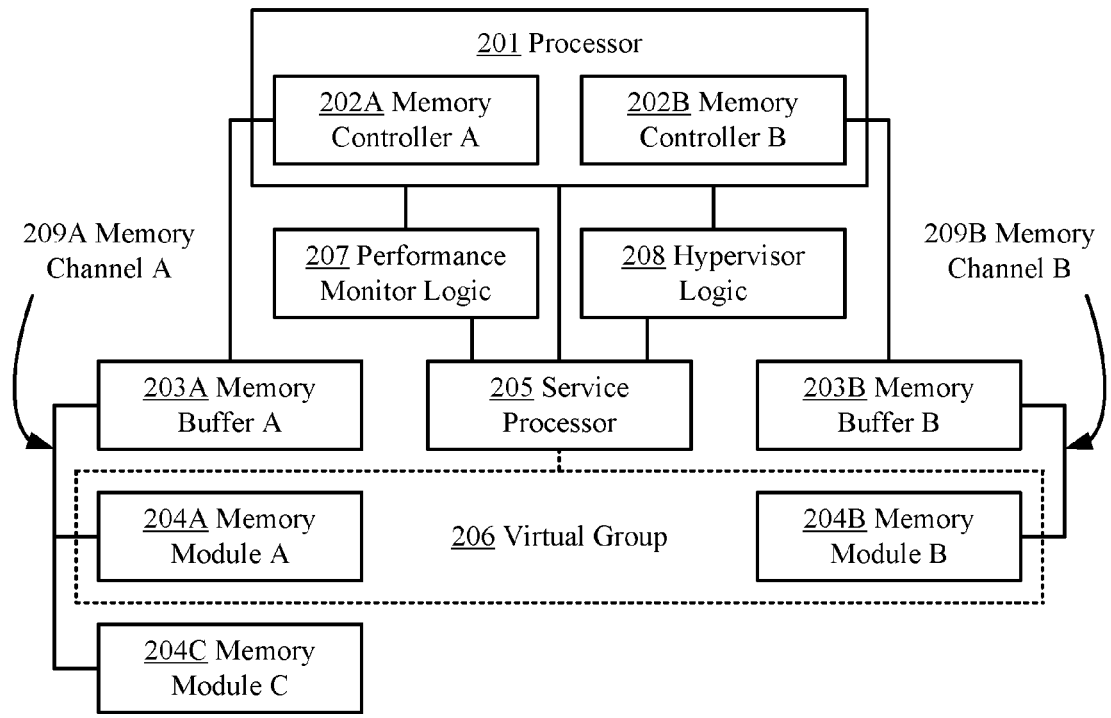
FIG. 2A – Memory System
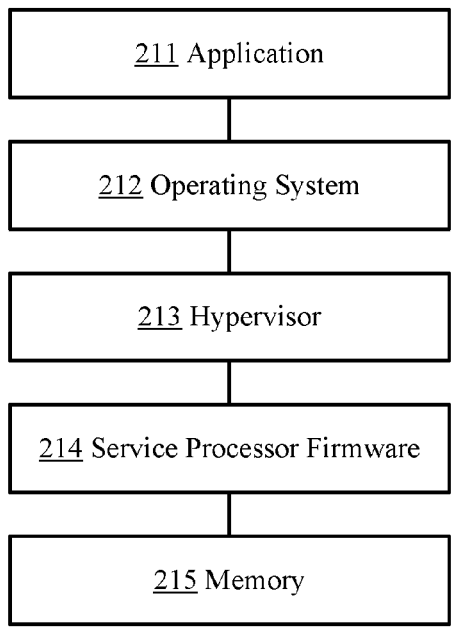
FIG. 2B – Memory Allocation

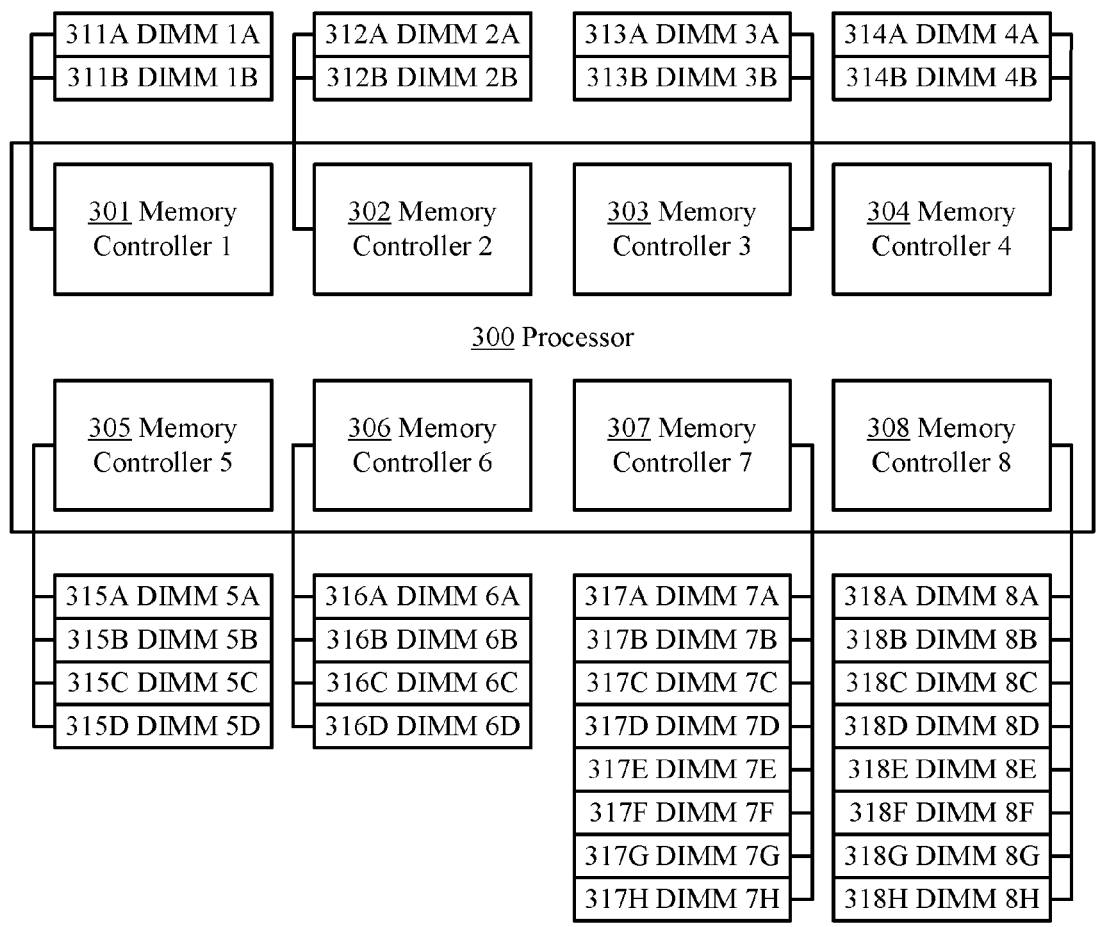
FIG. 3 – Memory Grouping Example System

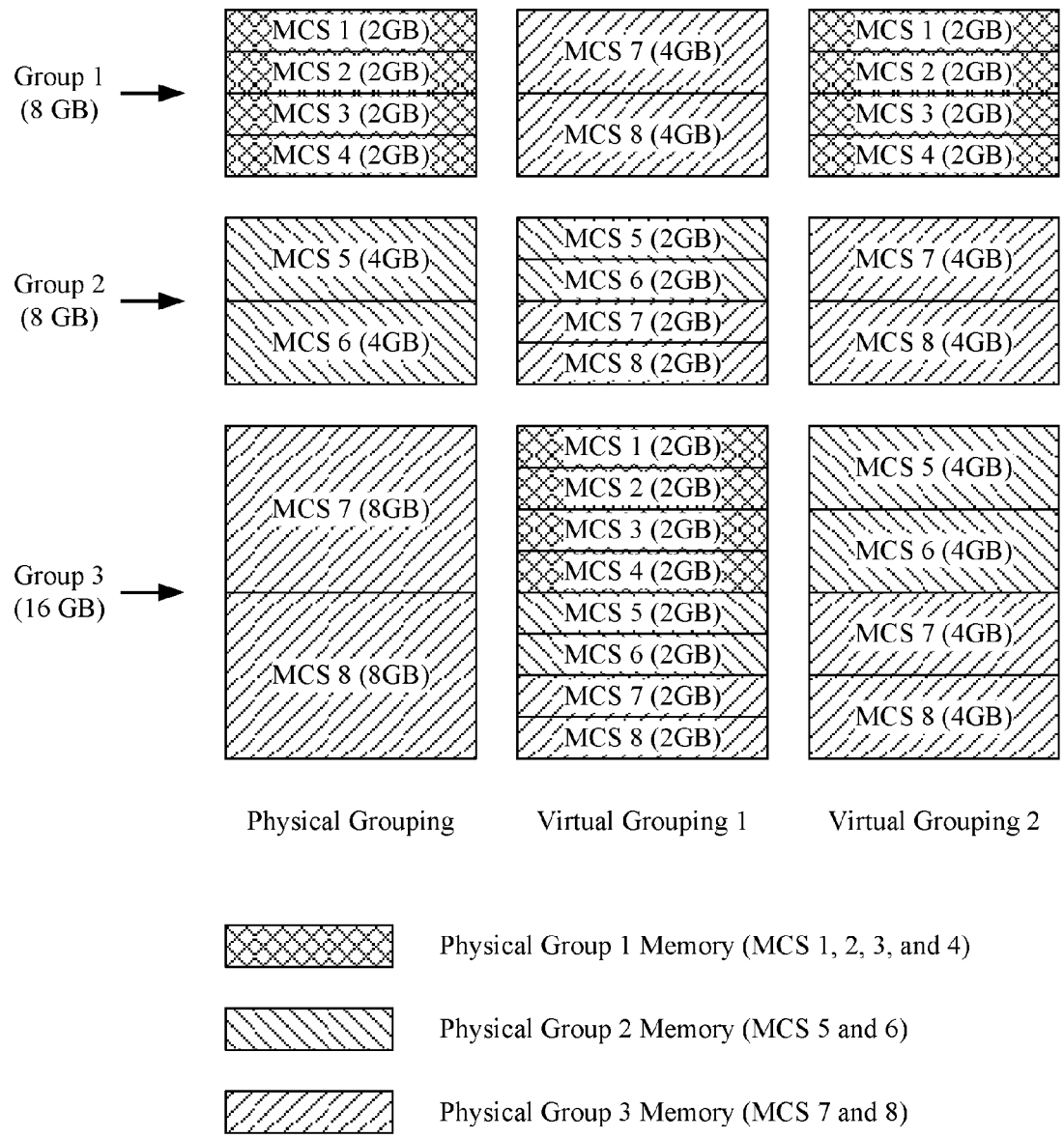
FIG. 4 – Memory Grouping Example

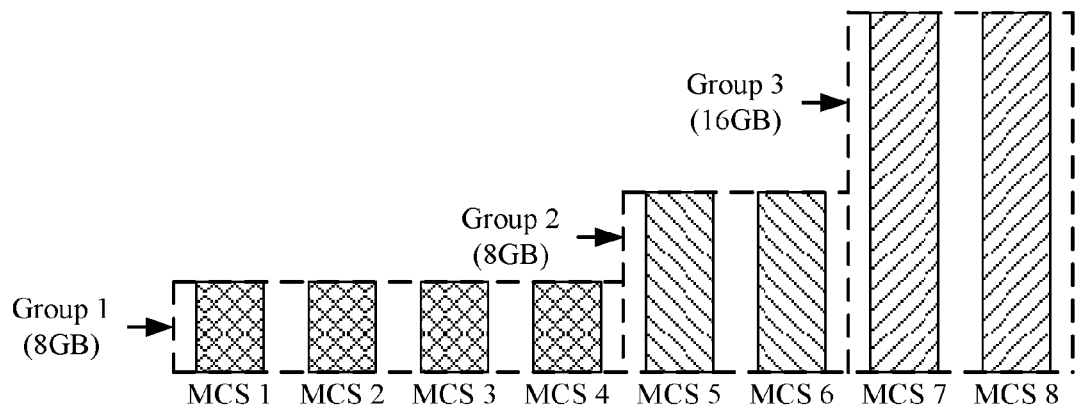
FIG. 5A – Physical Grouping
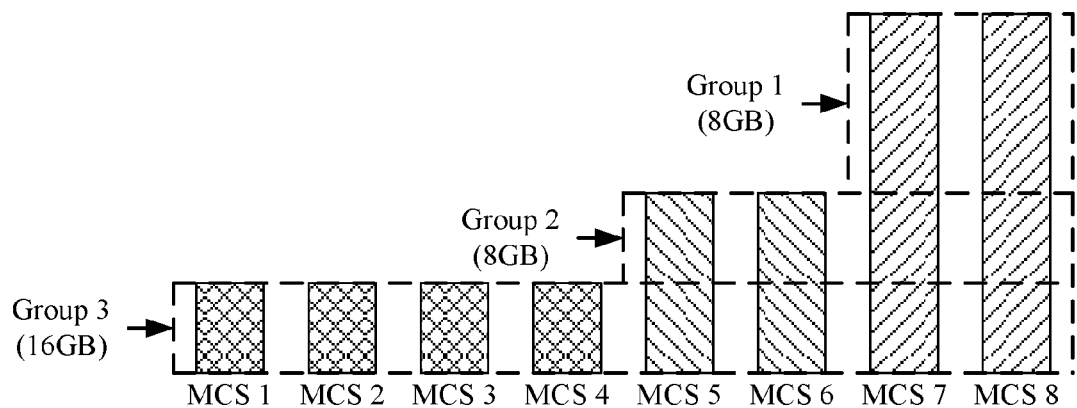
FIG. 5B – Virtual Grouping 1
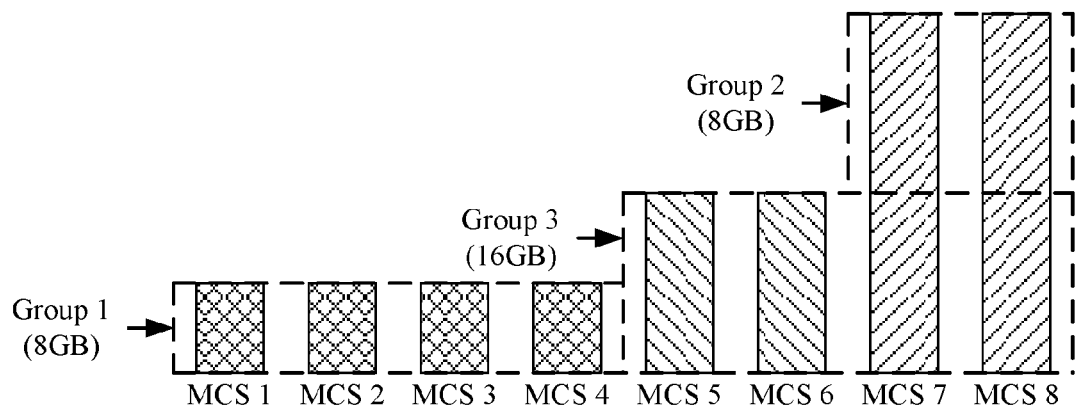
FIG. 5C – Virtual Grouping 2

US 9,600,187 B2

VIRTUAL GROUPING OF MEMORY

TECHNICAL FIELD

This disclosure relates to virtual memory grouping. In particular, it relates to virtual memory grouping across memory channels.

BACKGROUND

Main memory in a system can be setup in various physical configurations to optimize power consumption and performance. Memory may be mirrored for redundancy to mitigate DIMM failures. Fully mirrored memory, while being fully redundant, would cut the capacity of the memory in half vs. non-mirrored memory. However, memory may be selectively mirrored so that a portion of the memory is mirrored, such as that containing information critical to program operation, and the remainder of the memory is non-mirrored.

SUMMARY

The present disclosure includes a method, comprising: identifying, in a memory system, a capacity for each of a plurality of memory modules for a first memory channel having a first amount of memory and a second memory channel having a second amount of memory; determining a memory segment size from the capacities of the memory modules; identifying a first memory segment of the memory segment size for the first memory channel and a second memory segment of the memory segment size for the second memory channel; and creating a virtual group that includes the first memory segment and the second memory segment and that uses less than the entire first amount of memory from the first memory channel.

The present disclosure further includes a method, comprising identifying a capacity for each of a plurality of memory modules for a first memory channel and a second memory channel in a memory system; determining a first portion of memory modules and a second portion of memory modules from the capacities of the memory modules for each of the first and second memory channels; creating a first virtual group that includes the first portion of the memory modules from the first memory channel and the first portion of memory modules from the second memory channel; and creating a second virtual group that includes the second portion of the memory modules from the first memory channel and the second portion of memory modules from the second memory channel.

The present disclosure further includes a computer system, comprising service processor firmware configured to identify a capacity for each of a plurality of memory modules for a first memory channel having a first amount of memory and a second memory channel having a second amount of memory; determine a memory segment size from the capacities of the memory modules; identify a first memory segment of the memory segment size for the first memory channel and a second memory segment of the memory segment size for the second memory channel; and create a virtual group that includes first memory segment and the second memory segment and that uses less than the entire first amount of memory from the first memory channel.

BRIEF DESCRIPTION OF THE DRAWINGS

The drawings included in the present application are incorporated into, and form part of, the specification. They illustrate embodiments of the present invention and, along with the description, serve to explain the principles of the invention. The drawings are only illustrative of typical embodiments of the invention and do not limit the invention.

FIG. 1 is a flowchart of a method for creating virtual groups of memory, according to embodiments of the disclosure.

FIG. 2A is a diagram of a memory system, according to embodiments of the disclosure.

FIG. 2B is a diagram of memory allocation in a memory system, according to embodiments of the disclosure.

FIG. 3 is an example diagram of a memory system, according to embodiments of the disclosure.

FIG. 4 is an example diagram of grouping of memory segments for the system of FIG. 3, according to embodiments of the disclosure.

FIG. 5A is a diagram of memory from memory controller segments in physical groups for physical grouping, according to embodiments of the disclosure.

FIG. 5B is a diagram of memory from memory controller segments in virtual groups for virtual grouping 1, according to embodiments of the disclosure.

FIG. 5C is a diagram of memory from memory controller segments in virtual groups for virtual grouping 2, according to embodiments of the disclosure.

DETAILED DESCRIPTION

Memory modules in a memory system may be organized into groups along memory channels behind memory controllers and memory buffers to match the internal throughput of the system bus of a computer system. For example, a memory controller may have multiple memory buffers, each memory buffer having multiple memory channels leading to one or more DIMMs. Memory modules may be populated into memory channels in groups of similar sizes of memory to enable memory mirroring and memory interleaving, while unequal sizes of memory may be populated to form different groups. An operating system or hypervisor may allocate memory for an application as a physical group across multiple memory modules so that those memory modules may be accessed at the same time. The memory map for a particular physical group will likely be a single contiguous space.

Accessing memory according to the physical organization of the memory behind the memory controller may compromise memory throughput and affinity. Access to the memory groups may be limited by the physical characteristics of the memory, as the grouping is performed along physical boundaries. Mirrored data may be allocated to physical memory groups of equal sizes behind a memory buffer, which may reduce the memory flexibility and utilization of the system. Memory grouped according to a particular bandwidth may not be optimized for the way in which the memory is actually utilized by applications.

According to embodiments of the disclosure, memory may be virtually grouped and accessed to improve memory throughput and affinity. Memory segments of an identified memory size may be grouped virtually according to considerations such as the minimum memory module capacity, application priority, criticality, or memory access characteristics, and performance data for various memory module configurations. Virtual groups accessed by multiple memory controllers may scale the throughput high, as a greater number of memory modules may be accessed in parallel. Virtual groups of equal memory segments may be created from the same physical memory group or from physical memory groups of different sizes and behind multiple memory controllers. Memory presented as and allocated through virtual groups may be accessed symmetrically and diffusely through operations such as memory interleaving.

Performance and configuration information collected from memory in the virtual groups may be utilized by systems and users to improve physical memory access and application performance. The performance of memory in various virtual configurations may be used to create improved physical groupings of the memory modules through memory configuration and population rules. Data may be allocated to a particular memory group based on the priority of the application's data or the memory access characteristics of the application. Virtual groups may also support selective memory mirroring by identifying data to be mirrored and configuring virtual memory groups accordingly.

Method

FIG. 1 is a flowchart of a method for creating virtual groups of memory, according to embodiments of the disclosure. The memory capacities of one or more memory modules in the memory system may be determined, as in 100. Memory from the memory modules may be grouped into virtual groups, as in 110. Once the virtual groups are created, memory from the virtual groups may be allocated to applications, as in 120. The memory modules having memory in a virtual memory group may be monitored for performance, power consumption, and other usage statistics, as in 130.

To determine memory capacities of the memory modules, as in 100, the system may perform an initial program load, as in 101. Once the system has been initialized, vital product data for the memory modules may be collected, as in 102. Vital product data may include hardware information, such as serial number and capacity. The vital product data may be determined for the system or collected from a vital product data storage location on the system. The collection of vital product data may be performed by a system such as the host system of the memory system, a remote system, or a field replaceable unit.

Memory from the memory modules may be grouped into virtual memory groups, as in 110. The capacities of the memory modules may be scanned and evaluated from the vital product data of the memory modules, as in 111. A memory segment size (or portion) may be determined from the scanned memory module capacities, as in 112, according to the memory access characteristics of the memory module. In certain embodiments, the memory segment size may be the smallest independently operated memory unit for one or more physical memory groups, such as the smallest memory module size or a rank size in a memory module. The memory segment size may be evaluated for memory modules across two or more memory channels. For example, if a first memory channel has two 1 GB DIMMs, a second memory channel has four 1 GB DIMMs, the memory segment size may be the smallest memory module size in common between the two memory channels. In this example, 1 GB may be the memory segment size; alternately, 2 GB may be the memory segment size, as both groups have at least two 1 GB DIMMs.

Memory segments of the memory segment size may be identified for memory modules in the memory system, as in 113, and used to create a virtual memory group, as in 114. In the example above, the two 1 GB DIMMs from the first channel and two 1 GB DIMMs from the second channel may be grouped into a first group. If a third memory channel has two 1 GB DIMMs, the remaining two 1 GB DIMMs from the second memory channel may be grouped with the two 1 GB DIMMs from the third memory channel.

The virtual groups may contain memory from memory channels that is less than the total memory capacity of the memory channels. In some embodiments, a memory buffer or controller having two memory channels may have memory grouped into two or more virtual groups, each group containing memory from both memory channels. In other embodiments, a virtual group may have memory from memory channels of different memory capacity connected to two different controllers. In other embodiments, a virtual group may have memory from memory channels having different memory capacities.

Creation of virtual groups may be informed by performance information of the memory modules, as in 131. For example, if an executing processor in a distributed shared memory system has greater processor affinity to a certain group of DIMMs, those DIMMs may be used for the virtual group assigned to an application executed on that processor.

Once the virtual groups are created, memory from the virtual groups may be allocated to applications, as in 120. The application's priority, criticality, or memory access characteristics may inform the operating system or hypervisor as to which virtual group may be allocated to the application, as in 121. For example, if an application is known to have fairly linear memory access or is non-critical, a virtual group providing deeper memory access or limited to fewer memory modules may be used, so that memory for applications with more diffuse memory access or requiring greater fault tolerance may use virtual groups having a greater usage of memory modules. The virtual group may be targeted by or allocated to the application, as in 122. The application's performance may be monitored to determine the appropriateness of the virtual group for that application.

The memory modules in a virtual group may be monitored for performance and power consumption, as in 130. Information of the memory modules, such as performance and power consumption, may be collected, as in 131. The information may be used as feedback to determine memory module configuration options, as in 132. These memory module configuration options may be used to physically configure or populate the memory modules so as to be improve memory access, such as by increasing memory affinity or optimizing throughput. These configuration options may be used as DIMM plug rules when the DIMMs are off-line.

System

FIG. 2A is a diagram of a memory system, according to embodiments of the disclosure. A processor 201 may be connected to one or more memory controllers 202. The memory controller 202 may be part of the processor itself, as shown in FIG. 2, or on a separate chip. In this embodiment, the processor contains a memory controller A 202A and a memory controller B 202B.

Each memory controller may support one or more memory buffers 203. The memory buffer 203 may be part of the memory controller 202 or on a separate chip. Shown here, memory controller A 202A is connected to memory buffer A 203A, and memory controller B 202B is connected to memory buffer B 203B. Each memory controller 202 or memory buffer 203 may be connected to one or more memory modules 204 through one or more memory channels 209. Shown here, memory buffer A 203A is connected to memory module A 204A and memory module C 204C through memory channel A 209A, and memory buffer B 203B is connected to DIMM B 204B through memory channel B. The performance of the memory modules 204 and the processor 201 may be monitored by performance monitor logic 207.

The memory system may contain a service processor 205. The service processor 205 may be a hardware or firmware unit configured for virtual memory management. The service processor 205 may be configured to create virtual groups 206 of memory from the memory modules 204 of different memory channels 209. The service processor 205 may receive feedback from the performance monitor logic 207 as to performance of memory modules 204 in the virtual groups 206 and applications assigned to certain virtual groups 206. This performance information may be used by a hypervisor 208 to assign applications to virtual groups 206 or to provide configuration options for physical configuration of the DIMMs 204.

FIG. 2B is a diagram of memory allocation in a memory system, according to embodiments of the disclosure. Service processor firmware 214 may create virtual memory groups from memory 215. The memory 215 may include memory modules from across a memory system, including memory modules from different physical groups behind different processors, memory controllers, and memory buffers. An operating system 212, hypervisor 213, or application 211 may allocate memory 215 from the memory groups to the application 211. The service processor firmware 214 may present the memory 215 to the hypervisor 213 or operating system 212 as virtual groups.

Example

FIG. 3 is an example diagram of a memory system for use in the examples diagrams of FIG. 4, 5A, 5B, and 5C, according to embodiments of the disclosure. In this example, a processor 300 has eight memory controllers, each connected to multiple DIMMs through one or more memory channels (and optionally one or more memory buffers, not shown). The memory contained behind each memory controller may be referred to as the memory controller segment (MCS) for the memory controller. Memory controller 1 301 controls DIMM 1A 311A and DIMM 1B 311B as MCS 1; memory controller 2 302 controls DIMM 2A 312A and DIMM 2B 312B as MCS 2; memory controller 3 303 controls DIMM 3A 313A and DIMM 3B 313B as MCS 3; memory controller 4 304 controls DIMM 4A 314A and DIMM 4B 314B as MCS 4; memory controller 5 305 controls DIMM 5A 315A, DIMM 5B 315B, DIMM 5D 315C, and DIMM 5D 315D as MCS 5; memory controller 6 306 controls DIMM 6A 316A, DIMM 6B 316B, DIMM 6C 316C, and DIMM 6D 316D as MCS 6; memory controller 7 307 controls DIMM 7A 317A, DIMM 7B 317B, DIMM 7C 317C, DIMM 7D 317D, DIMM 7E 317E, DIMM 7F 317F, DIMM 7G 317G, and DIMM 7H 317H as MCS 7; and memory controller 8 308 controls DIMM 8A 318A, DIMM 8B 318B, DIMM 8C 318C, DIMM 8D 318D, DIMM 8E 318E, DIMM 8F 318F, DIMM 8G 318G, and DIMM 8H 318H as MCS 8. For this example, each DIMM may be equal to 1 gigabyte (GB) of memory for simplicity of explanation.

FIG. 4 is an example diagram of physical and virtual groupings of memory segments for the system of FIG. 3, according to embodiments of the disclosure. For a physical grouping, memory from a memory controller segment (MCS) may be grouped and accessed with memory from other memory controller segments having the same size and configuration to form physical groups for memory access. In this example, three physical groups may be formed. Group 1 may contain 8 GB of total memory, comprising the 2 GB of memory behind each of the four memory controllers 1-4. Group 2 may contain 8 GB of total memory, comprising the 4 GB of memory behind memory controllers 5 and 6. Group 3 may contain 16 GB of total memory behind memory controllers 7 and 8.

When the memory is grouped virtually, memory access may not be constrained to physical memory groups or memory controller segments, and a greater number of memory access configurations may be created. By virtually grouping smaller, equal segments of memory across memory channels, a greater number of memory buffers and controllers may access memory at a time, reducing access time to the memory. In this example, virtual groups having the same size as the physical groups discussed above may be formed, but with different memory access configurations.

For virtual grouping 1, 2 GB of memory from each memory controller 1-8 may be grouped as memory segments into group 3 to form a 16 GB group; 2 GB of memory from each memory controller 5-8 may be grouped into group 2 to form an 8 GB group; and 4 GB of memory from each memory controller 7 and 8 may be grouped into group 1 to form an 8 GB group.

For virtual grouping 2, 2 GB of DIMMs from each memory controller 1-4 may be grouped as memory segments into group 1 to form an 8 GB group; 4 GB of memory from each memory controller 7 and 8 may be grouped into group 2 to form an 8 GB group; and 4 GB of memory from each memory controller 5-8 may be grouped into group 3 to form a 16 GB group.

FIG. 5A, FIG. 5B, and FIG. 5C are diagrams of the physical and virtual groupings of memory from FIG. 4, according to embodiments of the disclosure. FIG. 5A is a diagram of memory from memory controller segments in physical groups for the physical grouping, according to embodiments of the disclosure. As discussed above, each physical group contains memory from memory controller segments of the same size and configuration.

FIG. 5B is a diagram of memory from memory controller segments in virtual groups for the virtual grouping 1, according to embodiments of the disclosure. Memory access to group 3 is spread across 8 memory controllers, which may allow for greater throughput. Processor operations that require accessing multiple segments of information simultaneously, such as parallel processing, or containing critical data may best utilize the memory access characteristics of virtual group 3. Critical process operations requiring similar fast access or high availability but for a smaller 8 GB capacity may best utilize the memory access characteristics of virtual group 2. Non-critical applications or application that may better utilize access to the same DIMM for information, such as deep or linear computing operations, may utilize virtual group 1. The memory segments from each memory controller segment are similarly sized, and may be used for symmetrical processes such as memory mirroring and interleaving.

For memory access administered with a lower overhead or for fewer critical or parallel access operations, a different virtual grouping configuration may be used. FIG. 5C is a diagram of memory from memory controller segments in virtual groups for the virtual grouping 2, according to embodiments of the disclosure. Applications utilizing faster memory access for parallel processes or performing more critical operations may be assigned group 1. Applications involving non-critical storage may be assigned group 2. Operations involving linear memory access or mirroring, such as database storage, may be assigned group 3, as access is spread across memory controllers. The 16 GB group capacity of group 3 is divided among four memory controllers for redundancy, two of which may contain original data and two of which may contain copy data.

Although the present disclosure has been described in terms of specific embodiments, it is anticipated that alterations and modifications thereof will become apparent to those skilled in the art. Therefore, it is intended that the following claims be interpreted as covering all such alterations and modifications as fall within the true spirit and scope of the disclosure.

What is claimed is:

1. A method for using a processor to manage a memory system, the memory system including a plurality of memory controllers, each memory controller coupled to a separate plurality of DIMMs via a separate memory channel, the method comprising:
    initializing, by the processor, the memory system;
    collecting, upon initialization of the memory system and by the processor, product data from the DIMMs;
    determining, by the processor and based on the collected product data, a capacity of each of the DIMMs;
    determining, by the processor and based on a comparison of the determined capacities of the DIMMs to each other, a smallest DIMM capacity;
    determining, by the processor, performance and power consumption characteristics for each of the DIMMs;
    creating, by the processor and based on the smallest DIMM capacity determination and further based on the determined performance and power consumption characteristics, a plurality of virtual memory groups for the DIMMs, wherein a first virtual memory group includes DIMMs from at least two of the separate memory channels, wherein a second virtual memory group includes other DIMMs from the at least two of the separate memory channels and at least one additional of the separate memory channels such that memory of the second virtual memory group is accessible via more memory channels than the first virtual memory group, and wherein the total memory capacity of the first virtual memory group and second virtual memory group are the same, and wherein the first virtual memory group is configured for being accessed by non-critical applications and the second virtual memory group is configured for being accessed by critical applications;
    identifying, by the processor, characteristics of a plurality of applications;
    determining, by the processor and based the characteristics, that a first application is a non-critical application;
    allocating, by the processor and in response to the determination that the first application is non-critical, memory from the first virtual memory group to the first application, wherein as allocated the first application has equal access to all of the at least two of the separate memory channels;
    determining, by the processor and based the characteristics, that a second application is a critical application that utilizes memory access for parallel processes; and
    allocating, by the processor and in response to the determination that the second application is a critical application that utilizes memory access for parallel processes, memory from the second virtual memory group to the second application, wherein as allocated the second application has equal access to all of the at least two of the separate memory channels and the at least one additional of the separate memory channels.

2. The method of claim 1, wherein the smallest DIMM capacity is one gigabyte (GB).

3. The method of claim 1, wherein the at least two of the separate memory channels comprises two memory channels, and wherein the at least one additional of the separate memory channels two additional memory channels.

4. The method of claim 1, wherein the collected product data is vital product data.

5. A system comprising:
    a memory system including a plurality of memory controllers, each memory controller coupled to a separate plurality of DIMMs via a separate memory channel; and
    a processor for managing the memory system, the processor configured to perform a method comprising:
        initializing the memory system;
        collecting, upon initialization of the memory system, product data from the DIMMs;
        determining, based on the collected product data, a capacity of each of the DIMMs;
        determining, based on a comparison of the determined capacities of the DIMMs to each other, a smallest DIMM capacity;
        determining performance and power consumption characteristics for each of the DIMMs;
        creating, based on the smallest DIMM capacity determination and further based on the determined performance and power consumption characteristics, a plurality of virtual memory groups for the DIMMs, wherein a first virtual memory group includes DIMMs from at least two of the separate memory channels, wherein a second virtual memory group includes other DIMMs from the at least two of the separate memory channels and at least one additional of the separate memory channels such that memory of the second virtual memory group is accessible via more memory channels than the first virtual memory group, and wherein the total memory capacity of the first virtual memory group and second virtual memory group are the same, and wherein the first virtual memory group is configured for being accessed by non-critical applications and the second virtual memory group is configured for being accessed by critical applications;
        identifying characteristics of a plurality of applications;
        determining, based the characteristics, that a first application is a non-critical application;
        allocating, in response to the determination that the first application is non-critical, memory from the first virtual memory group to the first application, wherein as allocated the first application has equal access to all of the at least two of the separate memory channels;
        determining, based the characteristics, that a second application is a critical application that utilizes memory access for parallel processes; and
        allocating, in response to the determination that the second application is a critical application that utilizes memory access for parallel processes, memory from the second virtual memory group to the second application, wherein as allocated the second application has equal access to all of the at least two of the separate memory channels and the at least one additional of the separate memory channels.

6. The system of claim 5, wherein the smallest DIMM capacity is one gigabyte (GB).

7. The system of claim 5, wherein the at least two of the separate memory channels comprises two memory channels, and wherein the at least one additional of the separate memory channels two additional memory channels.

8. The system of claim 5, wherein the collected product data is vital product data.

\* \* \* \* \*